(12) United States Patent
Zhang et al.

(10) Patent No.: US 11,451,762 B2
(45) Date of Patent: Sep. 20, 2022

(54) HEAD-MOUNTED VIEWABLE DEVICE AND EYE-TRACKING SYSTEM FOR USE IN HEAD-MOUNTED VIEWABLE DEVICE

(71) Applicant: Yuyao Sunny Optical Intelligence Technology Co., Ltd., Yuyao (CN)

(72) Inventors: Kouwen Zhang, Yuyao (CN); Meishan Guo, Yuyao (CN); Litong Song, Yuyao (CN); Wei Tang, Yuyao (CN); Jian Xie, Yuyao (CN)

(73) Assignee: Yuyao Sunny Optical Intelligence Technology Co., Ltd., Yuyao (CN)

( * ) Notice: Subject to any disclaimer, the term of this patent is extended or adjusted under 35 U.S.C. 154(b) by 0 days.

(21) Appl. No.: 17/266,978

(22) PCT Filed: Apr. 29, 2019

(86) PCT No.: PCT/CN2019/084943
§ 371 (c)(1),
(2) Date: Feb. 8, 2021

(87) PCT Pub. No.: WO2020/038015
PCT Pub. Date: Feb. 27, 2020

(65) Prior Publication Data
US 2021/0314554 A1 Oct. 7, 2021

(30) Foreign Application Priority Data
Aug. 20, 2018 (CN) .......................... 201810945241.1

(51) Int. Cl.
*H04N 13/344* (2018.01)
*G02B 3/04* (2006.01)
(Continued)

(52) U.S. Cl.
CPC ............. *H04N 13/344* (2018.05); *G02B 3/04* (2013.01); *G02B 25/001* (2013.01);
(Continued)

(58) Field of Classification Search
None
See application file for complete search history.

(56) References Cited

U.S. PATENT DOCUMENTS 10,979,685 B1* 4/2021 Silverstein ........... H04N 13/117
11,073,906 B1* 7/2021 Hudman ............... G06F 3/0304
(Continued)

*Primary Examiner* — Talha M Nawaz
(74) *Attorney, Agent, or Firm* — Raymond Y. Chan; David and Raymond Patent Firm

(57) ABSTRACT

A head-mounted viewable device includes a display configured to display and project a virtual scene image to a user's eye, a VR optical lens configured to construct an optical path between the display and the user's eye for allowing a virtual scene image being observed by the user's eye, and an eye-tracking system configured to detect a sight direction of the user's eye and adjust a display position of the virtual scene image based on the detected sight direction. The eye-tracking system includes at least one light source configured to project the detection light and a receiving module configured to receive the reflected detection light reflected to determine the sight direction of the user's eye. The receiving module is positioned at a side of the VR optical lens and arranged to face towards the user's eye such that the detection light reflected by the user's eye is directly received by the receiving module.

9 Claims, 6 Drawing Sheets

(51) Int. Cl.
*G02B 25/00* (2006.01)
*H04N 13/383* (2018.01)
*G02B 27/00* (2006.01)
*G06F 3/01* (2006.01)

(52) U.S. Cl.
CPC ......... *G02B 27/0093* (2013.01); *G06F 3/013* (2013.01); *H04N 13/383* (2018.05)

(56) References Cited

U.S. PATENT DOCUMENTS

2020/0278539 A1* 9/2020 Petljanski .............. G09G 3/003
2021/0235054 A1* 7/2021 Silverstein .............. G06F 3/011

* cited by examiner

HEAD-MOUNTED VIEWABLE DEVICE AND EYE-TRACKING SYSTEM FOR USE IN HEAD-MOUNTED VIEWABLE DEVICE

CROSS REFERENCE OF RELATED APPLICATION

This is a U.S. National Stage under 35 U.S.C. 371 of the International Application Number PCT/CN2019/084943, filed Apr. 29, 2019, which claims priority under 35 U.S.C. 119(a-d) to Chinese application number CN201810945241.1, filed Aug. 20, 2018, which are incorporated herewith by references in their entirety.

BACKGROUND OF THE PRESENT INVENTION

Field of Invention

The present invention relates to the field of virtual reality, and more particularly to a head-mounted viewable device and eye-tracking system thereof.

Description of Related Arts

In recent years, virtual reality (VR) and augmented reality (AR) have created a special visual experience for human beings. VR (Virtual Reality) is an interactive visual experience in a simulated environment with computer-generated virtual scene. The immersive simulated environment can be similar to or far different from the real world, thus creating a special visual experience that cannot be realized in the normal real world. There are many VR-related products in the market, with which users can be immersed in and interact with the simulated three-dimensional virtual environment.

A typical VR (Virtual Reality) product is head-mounted viewable device, which looks like a pair of glasses. During use, a user wears the apparatus around his or her head for a virtual reality experience. The mainstream supportive technologies for the head-mounted display include SLAM (Simultaneous Localization and Mapping) and eye tracking technology, wherein the SLAM is mainly adapted for constructing an immersive virtual environment that is displayed at a position that can be observed by the user, and the role of the eye tracking technology is to detect a sight direction of the user's eye, so as to adjust the display position of the virtual scene to a visible position based on the detected sight direction.

However, there are still many technical difficulties in the implementation of the head-mounted viewable device, especially the design of the optical system thereof, which seriously affect user's virtual visual experience and limit a wider application of the head-mounted viewable device in real industry.

SUMMARY OF THE PRESENT INVENTION

The invention is advantageous in that it provides a head-mounted viewable device and eye-tracking system thereof, wherein a VR (Virtual Reality) optical lens is not in an optical path of an eye-tracking system, so as to simplify the overall optical arrangement design for the head-mounted viewable device for easier implementation.

Another advantage of the invention is to provide a head-mounted viewable device and eye-tracking system thereof, wherein the optical path of the eye-tracking system does not pass through the VR optical lens, and thus the VR optical lens merely needs to optically process the images to be displayed and projected from a display, without having to take consideration of the interference of the eye tracking system. In other words, the optical parameters of the VR lens are relatively uniform so as to facilitate an optical design and manufacturing of the VR optical lens.

Another advantage of the invention is to provide a head-mounted viewable device and eye-tracking system thereof, wherein the optical path of the eye-tracking system does not pass through the VR optical lens. In other words, the VR optical lens and the eye-tracking system are optically independent with each other, thereby improving the stability of the overall performances of the head-mounted viewable device.

Another advantage of the invention is to provide a head-mounted viewable device and eye-tracking system thereof, wherein a detection light intended for eye-tracking, after being diffused and reflected by the user's eye, is directly perceived by a receiving module of the eye-tracking system, so that compared with the conventional eye-tracking system of the head-mounted viewable device, a reflector for reflecting the detection light can be eliminated, thereby simplifying the optical system of the eye-tracking system and reducing the costs thereof.

Another advantage of the invention is to provide a head-mounted viewable device and eye-tracking system thereof, wherein a plane defined by a photosensitive element of the receiving module and a plane defined by an optical lens thereof are at a predetermined angle. In other words, the plane defined by the photosensitive element is inclined with the plane defined by the optical lens, in such an "inclined imaging" manner to simplify the design of the optical system of the receiving module so as to improve the imaging quality of the receiving module.

Another advantage of the invention is to provide a head-mounted viewable device and eye-tracking system thereof, wherein the relative illumination of the images captured by the receiving module is compensated in such an "inclined imaging" manner.

Another advantage of the invention is to provide a head-mounted viewable device and eye-tracking system thereof, wherein the light source for generating and projecting the detection light in the eye-tracking system of the present invention has a relatively smaller size, so that the interference of the light source to the observation of the user' eye can be substantially minimized. In other words, the light source with a relatively smaller size is able to reduce a blind area of the user's eye.

Another advantage of the invention is to provide a head-mounted viewable device and eye-tracking system thereof, wherein, in one embodiment of the present invention, the eye-tracking system is integrally configured with the VR optical lens, so that the eye-tracking system has a more stable positional relationship with the VR optical lens, so as to improve the stability of the eye-tracking system and the VR optical lens.

Another advantage of the invention is to provide a head-mounted viewable device and eye-tracking system thereof, wherein, in one embodiment of the present invention, the eye-tracking system is integrally configured with the VR optical lens, so as to substantially eliminate the errors generated during the assembling process of the eye-tracking system and the VR optical lens and to facilitate the subsequent maintenance for the head-mounted viewable device, while the weight of the head-mounted viewable device can be reduced as well.

Another advantage of the invention is to provide a head-mounted viewable device and eye-tracking system thereof, wherein, in one embodiment of the present invention, the display of the head-mounted viewable device is movable relative to the VR optical lens, so that the diopter of the user's eye can be adjusted by changing a distance between the display and the VR optical lens for ensuring the user's VR experience.

Additional advantages and features of the invention will become apparent from the description which follows and may be realized by means of the instrumentalities and combinations particular point out in the appended claims.

According to the present invention, the foregoing and other objects and advantages are attained by a head-mounted viewable device, comprising:

a display configured for displaying and projecting a virtual scene image to a user's eye;

a VR (Virtual Reality) optical lens configured to construct an optical path between the display and the user's eye for allowing the virtual scene image being displayed at the display reached at the user's eye through the VR optical lens; and an eye-tracking system configured to detect a sight direction of the user's eye, and adjust a display position of the virtual scene image at the display based on the detected sight direction, wherein the eye-tracking system comprises:

at least one light source, configured to project a detection light to the user's eye; and a receiving module, configured to receive the detection light reflected by the user's eye so as to determine the sight direction of the user's eye, wherein the receiving module is located at a side of the VR optical lens and faces towards the user's eye such that the detection light reflected by the user's eye is able to be directly received by the receiving module.

In one embodiment of the present invention, the receiving module comprises an optical lens unit and a photosensitive element, wherein the optical lens unit comprises at least one optical lens for receiving the detection light reflected by the user's eye, and the plane defined by the photosensitive element and the plane defined by the at least one optical lens has an included angle defined therebetween.

In one embodiment of the present invention, the predetermined included angle between the plane defined by the photosensitive element and the plane defined by the at least one optical lens is determined based on an angle between an object optical axis defined by the user's eye and an imaging optical axis defined by the receiving module, and optical parameters of the at least one optical lens.

In one embodiment of the present invention, the included angle between an object optical axis defined by the user's eye and an imaging optical axis defined by the receiving module is determined based on the distance between the user's eye and the VR optical lens, a predetermined diameter of the user's eye, and a distance between the VR optical lens and the receiving module.

In one embodiment of the present invention, the included angle between the object optical axis defined by the user's eye and the imaging optical axis defined by the receiving module is ranged: 25.0°~40.0°.

In one embodiment of the present invention, the included angle between the object optical axis defined by the user's eye and the imaging optical axis defined by the receiving module is 32°.

In one embodiment of the present invention, the included angle between the plane defined by the photosensitive element and the plane defined by the at least one optical lens is 20°.

In one embodiment of the present invention, the at least one optical lens is embodied as a single piece of aspheric optical lens.

In one embodiment of the present invention, the at least one light source comprises eight light sources, wherein the eight light sources are peripherally provided along a peripheral edge of the VR optical lens for projecting the detection light to the user's eye.

In one embodiment of the present invention, each of the light sources comprises one or more optical fibers and a non-visible light source communicating with the one or more optical fibers, such that when the non-visible light source is activated, each of the one or more optical fibers projects the detection light respectively.

In one embodiment of the present invention, the display is movable relative to the VR optical lens, so as to adjust a diopter of the user's eyeball by changing the distance between the display and the VR optical lens.

According to another aspect of the present invention, it further provides an eye-tracking system for a head-mounted viewable device, which comprises:

at least one light source, configured to project a detection light to the user's eye; and a receiving module, configured to receive the detection light reflected by the user's eye so as to determine the sight direction of the user's eye, wherein the receiving module is located at a side of a VR (Virtual Reality) optical lens and faces towards the user's eye such that the detection light reflected by the user's eye is able to be directly received by the receiving module.

In one embodiment of the present invention, the receiving module comprises an optical lens unit and a photosensitive element, wherein the optical lens unit comprises at least one optical lens for receiving the detection light reflected by the user's eye, and the plane defined by the photosensitive element and the plane defined by the at least one optical lens has an included angle defined therebetween.

In one embodiment of the present invention, the predetermined included angle between the plane defined by the photosensitive element and the plane defined by the at least one optical lens is determined based on an angle between an object optical axis defined by the user's eye and an imaging optical axis defined by the receiving module, and optical parameters of the at least one optical lens.

In one embodiment of the present invention, the included angle between an object optical axis defined by the user's eye and an imaging optical axis defined by the receiving module is determined based on the distance between the user's eye and the VR optical lens, a predetermined diameter of the user's eye, and a distance between the VR optical lens and the receiving module.

In one embodiment of the present invention, the included angle between the object optical axis defined by the user's eye and the imaging optical axis defined by the receiving module is 32°, and the included angle between the plane defined by the photosensitive element and the plane defined by the at least one optical lens is 20°.

In one embodiment of the present invention, the at least one optical lens is embodied as a single piece of aspheric optical lens.

In one embodiment of the present invention, the at least one light source comprises eight light sources, wherein the eight light sources are peripherally provided along a peripheral edge of the VR optical lens for projecting the detection light to the user's eye, wherein each of the light sources comprises one or more optical fibers and a non-visible light source communicating with the one or more optical fibers, such that when the non-visible light source is activated, each of the one or more optical fibers projects the detection light respectively.

According to another aspect of the present invention, it further provides an eye-tracking method of a head-mounted viewable device, comprising the following steps:

projecting a detection light to a user's eye; and receiving the detection light reflected by the user's eye by a receiving module to detect a sight direction of the user's eye, wherein the receiving module is located at a side of a VR optical lens and faces towards the user's eye such that the detection light reflected by the user's eye can be directly received by the receiving module.

According to another aspect of the present invention, it further provides a diopter adjusting method for a head-mounted viewable device, comprising a step of:

moving a display to adjust a distance between the display and a VR (Virtual Reality) optical lens, so as to adjust a diopter of the user's eye.

In one embodiment of the present invention, the eye-tracking system is integrally configured with the optical VR lens that the VR optical lens and the eye-tracking system have an integral structure.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

As mentioned that, the mainstream supportive technologies for the head-mounted display are SLAM (Simultaneous Localization and Mapping) and eye tracking technology. However, there are still many technical difficulties in the implementation of the head-mounted viewable device, especially the design of the optical system thereof.

Figure 1:
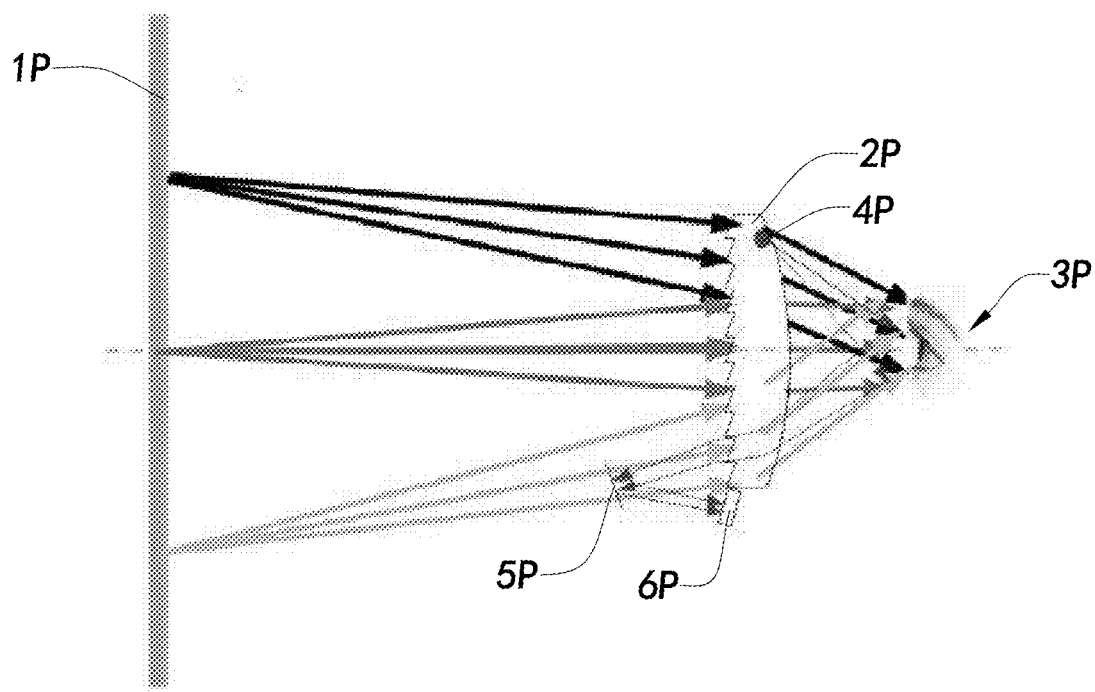
FIG. 1 is a schematic view of an optical system of a conventional head-mounted viewable device.

FIG. 1 is a schematic view of an optical system according to a conventional head-mounted viewable device. As shown in FIG. 1, the optical system of the conventional head-mounted viewable device mainly includes two optical paths: virtual imaging optical path and eye-tracking optical path. In particular, the virtual imaging optical path is typically from a display 1P—a VR (Virtual Reality) optical lens 2P—the user's eye 3P. During operation, the virtual scene image projected from the display 1P passes through the VR optical lens 2P and then reaches at the user's eye 3P, such that the virtual scene image can be observed by the user's eye for allowing the user to interact with it. The eye-tracking optical path is typically from a light source 4P—the user's eye 3P—the VR optical lens 2P—a reflector 5P—receiving module 6P. The eye-tracking optical system is intended for detecting a sight direction of the user's eye 3P so as to adjust a display portion of the virtual scene image at the display 1P based on detected sight direction of the user's eye, thereby ensuring that the virtual scene image is displayed at a position of the display 1P that can be observed by the user's eye 3P. However, such configuration of the optical system has many drawbacks.

First of all, both the virtual imaging path and the eye-tracking path pass through the VR optical lens 2P. In other words, the VR optical lens 2P needs to optically process a visible light and a non-visible light (the light in the virtual imaging path is visible light while the light in the eye-tracking optical path is non-visible light). Those who skilled in the art would easily know that it is difficult to design an optical component that is capable of optically processing two optical lights with different wavelengths. Even if such VR optical lens 2P can be produced by a complicated manufacturing technique, the VR optical lens 2P and corresponding optical system including the VR optical lens 2P has a relatively poor stability in their performances. In other words, due to a vibration or other unexpected factors that cause an offset of the VR optical lens 2P, the performance of the virtual imaging optical path and the eye tracking optical path would be badly affected.

Figure 2:
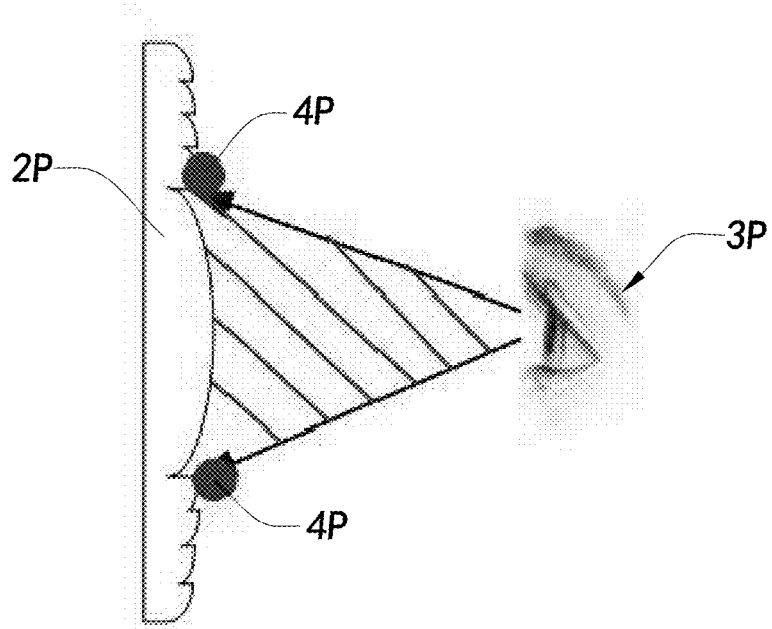
FIG. 2 is a schematic diagram illustrating a LED light source of an eye-tracking system projecting a detection light to the user's eye according to the above conventional head-mounted viewable device.

Furthermore, the light source 4P of the conventional eye-tracking system is embodied as a LED light source peripherally provided along the peripheral edge of the VR optical lens 2P for projecting the detection light to the user's eye 3P. It should be noted that since the LED light source is provided at the peripheral edge of the VR optical lens 2P towards the user's eye 3P, the positions and arrangement of the LED light source defines a blind area that limits a field of view of the user's eye 3P. FIG. 2 is a schematic diagram illustrating a LED light source of an eye-tracking system projecting a detection light to the user's eye according to the above conventional head-mounted viewable device. As show in the FIG. 2, the user's field of view is limited by the shadow area defined by the LED light source, that the area beyond the shadow area cannot be observed. It is appreciated that since the size of the LED light source is relatively large, the adverse effect of the LED light source interfering with the visual experience of the head-mounted viewable device is relatively undesirable.

In addition, since the eye-tracking optical path is from the light source 4P—the user's eye 3P—the VR optical lens 2P—the reflector 5P—the receiving module 6P, the relative positions of the light source 4P, the VR optical lens 2P and the reflector 5P and the relative positions between the reflector 5P and the receiving module 6P should be maintained in a high accuracy for ensuring a detection accuracy of the eye-tracking system, which undoubtedly results in an difficult increasement in its optical design difficulty and assembly while the structure of the eye-tracking system is more complicated.

Figure 3:
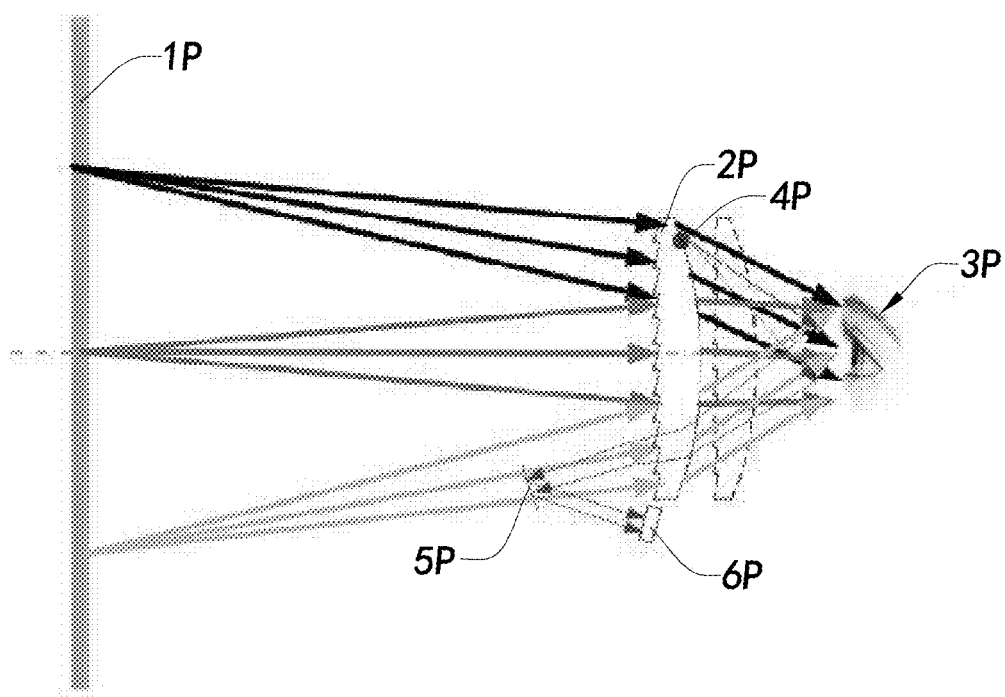
FIG. 3 is a schematic diagram illustrating the process of adjusting a diopter of the conventional head-mounted viewable device.

Furthermore, as it is well known, the head-mounted viewable device should be fitted to the user' eye corresponding to his/her eyesight. Referring to the FIG. 3 of the drawings, one technical solution fulfilling this requirement according to the conventional head-mounted viewable device is illustrated, wherein a diopter of the conventional head-mounted viewable device is adjusted by the following approach that moving the VR optical lens 2P relative to the reflector 5P and the receiving module 6P, so as to adjust the focus position of the virtual scene image at the display relative to the user's eye, while the relative positions between the reflector 5P and the receiving module 6P remains fixed. However, when moving the VR optical lens, a distance between the user's eye 3P and the receiving module 6P in the eye tracking optical path is changed, which causes the imaging quality of the receiving module 6P being affected and thus the detection accuracy of the sight direction of the user's eye is reduced.

In order to solve the above technical problems, a main inventive concept of the present invention is to change the optical path design of the eye-tracking system that the detection light for detecting the sight detection of the user's eye is directly received by the receiving module without passing through and being optically processed by the VR optical lens. In other words, the optical path of the eye-tracking system is independent from the virtual imaging optical path in the present disclosure, so that the design(s) and configuration(s) of the eye-tracking system can be simplified, while the overall performance of the head-mounted viewable device can be more stable.

Based on this main conception, the present invention discloses a head-mounted viewable device, which comprises a display configured to display and project a virtual scene image to a user's eye; a VR (Virtual Reality) optical lens configured to construct an optical path between the display and the user's eye for allowing the virtual scene image being displayed at the display reached at the user's eye through the VR optical lens; and an eye-tracking system configured to detect a sight direction of the user's eye and adjust a display position of the virtual scene image at the display based on the detected sight direction, wherein the eye-tracking system comprises: at least one light source configured to project a detection light to the user's eye; and a receiving module configured to receive the detection light reflected by the user's eye so as to determine the sight direction of the user's eye, wherein the receiving module is located at a side of the VR optical lens and faces towards the user's eye such that the detection light reflected by the user's eye can be directly received by the receiving module.

Embodiment of Head-Mounted Display Apparatus

Referring to FIGS. 4 to 10 of the drawings, a head-mounted viewable device according to a preferred embodiment of the present invention is illustrated, wherein the head-mounted viewable device is adapted for being worn around a user's head to experience the virtual reality.

Figure 4:
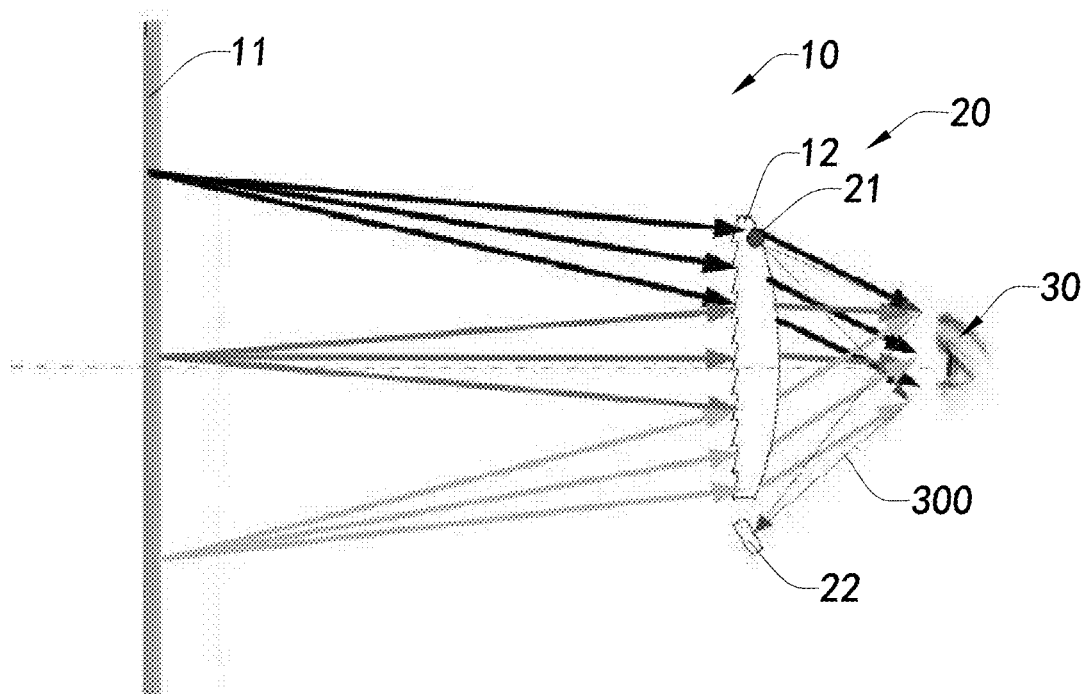
FIG. 4 is a schematic view of an optical system of a head-mounted viewable device according to a preferred embodiment of the present invention.

FIG. 4 is a schematic view of an optical system of a head-mounted viewable device according to the above preferred embodiment of the present invention. As shown in the FIG. 4 of the drawings, the optical system of the head-mounted viewable device mainly comprises a virtual imaging system 10 and an eye-tracking system 20.

Accordingly, the virtual imaging system 10 comprises a display 11 and a VR (Virtual Reality) optical lens 12, wherein the display 11 is configured to display and project a virtual scene image to a user's eye user's eye 30, while the VR optical lens 12 is positioned between the display 11 and the user's eye 30 for constructing an optical path between the display 11 and the user's eye so as for enabling the virtual scene image displayed at and projected from the display 11 to be observed by the user's eye 30 through the VR optical lens 12.

The eye-tracking system 20 comprises at least one light source 21 and a receiving module 22, wherein the at least one light source 21 is configured to project a detection light 200 to the user's eye 30, while the receiving module 22 is arranged to receive the reflected detection light 200 from the user's eye 30, so as to detect a sight direction of the user's eye 30. Upon acquiring the sight direction of the user's eye 30 via the eye-tracking system 20, a display position of the virtual scene image at the display 11 is adjusted responsive to the detected sight direction for enabling the virtual scene image to be observed by the user's eye 30. In other words, the eye-tracking system 20 is incorporated with the virtual imaging system 10 for enabling that the virtual scene image displayed at and projected from the display 11 can always be observed by the user's eye 30 so that the user is allowed to interact with the virtual scene images to enrich his or her VR experience.

In the preferred embodiment, the virtual scene image displayed at and projected from the display 11 is produced via SLAM algorithm. Those who skilled in the art would understand that SLAM algorithm is an advance technology in the field of vision spatial positioning, mainly for constructing an immersive virtual scene (images). Through the SLAM algorithm, the spatial positioning of human eye for head-mounted viewable device and construct an environment map can be accomplished. After the immersive virtual scene constructed through the SLAM algorithm, the virtual scene images can be directly displayed at the display 11, or that the display 11 can be projected to the display 11 via a projection device. In other words, the display 11 can be embodied as an active display or a passive screen according to the preferred embodiment of the present invention.

Accordingly, when the display 11 is embodied as an active display (such as a LCD display), the virtual scene image(s) produced via the SLAM algorithm may be directly displayed at a particular position of the display 11. Then, the user is able to observe the virtual scene image(s) formed at the display 11 through the VR optical lens 12. Correspondingly, when the display 11 is embodied as a passive screen, the head-mounted viewable device may further comprises a projection device for projecting the virtual scene image to a particular position of the display 11. Similarly, the virtual scene image displayed at the display 11 can also be observed by the user through the VR optical lens 12. The difference between the two is that as the display 11 is embodied as an active display, the virtual scene image is directly displayed at a particular position thereof, that is the display 11 proactively projects the virtual scene image to the one or more eyeballs 30 of a user who wears the head-mounted viewable device, and that as the display 11 is embodied as a passive screen, the display 11 is adapted for displaying the virtual scene image projected from the projection device, that is the display 11 passively projects the virtual scene image to the user's eye 30.

As mentioned above, upon detecting and acquiring a sight direction of the user's eye 30 via the eye-tracking system 20, a display position of the virtual scene image at the display 11 is adjusted correspondingly so as to ensure the virtual scene image displayed at the display 11 is always within a field of view of the user's eye 30. Correspondingly, when the display 11 is embodied as the active display, after information of the sight direction of the user's eyeball is detected and obtained, the display 11 is capable of proactively changing the display position of the virtual scene image thereat for ensuring that the virtual scene image displayed at the display 11 can be observed by the user's eye 30 through the VR optical lens 12. When the display 11 is embodied as a passive display, the adjustment of the display position of the virtual scene image at the display 11 is implemented through the projection device. Accordingly, upon detecting and obtaining the sight direction of the user's eye 30, the projection device is arranged to change its projection direction based on the detected sight direction so as to adjust the display position of the virtual scene image at the display 11 correspondingly, thereby ensuring that the virtual scene image displayed at the display 11 can be observed by the user's eye 30 through the VR optical lens 12.

Furthermore, the VR optical lens 12 is embodied as a Fresnel lens according to the preferred embodiment of the present invention. Those who skilled in the art would understand that the Fresnel lens, also known as threaded lens, has a plurality of zigzag-shaped grooves formed at one side thereof for optically processing, such as refracting or reflecting, a light wave within a predetermined wavelength band. Compared with other optical lenses, the Fresnel lens is advantageous in lower cost. Certainly, person skilled in the art would understand that, in the preferred embodiment, the VR optical lens 12 can also be embodied as other types of optical lens, that is not intended to be limiting in the present invention.

It is appreciated that the performances of the head-mounted viewable device are mainly determined by the virtual imaging system 10, the eye-tracking system 20, and the implementation and optical relationship between the virtual imaging system 10 and the eye-tracking system 20. As mentioned above, in the conventional head-mounted viewable device, the virtual imaging path and the eye-tracking are both passing through the VR optical lens. In other words, the virtual imaging system and the eye-tracking system is an optical system having closely structural relationship with each other, which causes a series of technical problems (as mentioned above).

Correspondingly, as shown in the FIG. 4 of the drawings, the optical path arrangement for the eye-tracking system 20 is adjusted in the preferred embodiment of the present invention that, the detection light 200 for detecting the sight direction of the user's eye 30 is directly received by the receiving module 22 without passing through the VR optical lens 12. Accordingly, the virtual imaging system 10 and the eye-tracking system 20 are remained independent with each other according to the present invention, so as to reduce the complexity of the design of the eye-tracking system 20, to simplify the structure thereof, and to enhance the stability of the overall performance of the head-mounted viewable device, and etc.

In particular, the receiving module 22 of the eye-tracking system 20 in the preferred embodiment of the present invention is arranged facing towards the user's eye 30, such that the detection light 200 reflected by the user's eye 30 can be directly received by the receiving module 22 without passing through the VR optical lens 12 and being reflected by any reflector as required in the conventional eye-tracking system of the conventional head-mounted viewable device. In other words, the VR optical lens 12 in the present invention merely needs to optically process the visible light of the virtual scene image projected by the display 11 without having to optically process the non-visible light of the detection light in the eye-tracking optical system. In other words, the difficulty of the optical design of the VR optical lens 12 can be reduced while its structure is simplified.

Further, owing to the specific arrangement of the receiving module 22 (facing towards the user's eye 30), the optical path of the eye-tracking system 20 has been simplified to an order of at least one light source 21—the user's eyeball 30—the receiving module 22, instead of the order of at least one the light source 21—the user's eyeball—the VR optical lens—the reflector—the receiving module in the conventional head-mounted viewable device. As it can be seen from the simplification of the optical path of the eye-tracking system 20, the number of the optical components involved in the eye-tracking system 20 is reduced. Those who skilled in the art would understand that a single system that includes fewer elements is more easily to be assembled with a high incorporating accuracy among the elements so as to ensure a more stable system relatively. In other words, the design difficulty, the assembly difficulty, and the complexity of the structure of the eye tracking system 20 can be reduced according to the preferred embodiment of the present invention.

It is appreciated that the virtual imaging system 10 and the eye-tracking system 20 are structurally independent with each other by adjusting the optical path of the eye-tracking system 20. In other words, from a structural perspective, the virtual imaging system 10 and the eye-tracking system 20 are two completely independent systems. Those who skilled in the art would understand that, for multiple systems, the lower the degree of the association among the systems is, the more stable the associating systems will be. According to the preferred embodiment of the present invention, there is no common optical component between the virtual imaging system 10 and the eye-tracking system 20. That is, the degree of association between the virtual imaging system 10 and the eye-tracking system 20 is relatively low, and thus the head-mounted viewable device which comprises the virtual imaging system 10 and the virtual imaging system 10 has a more stable performance.

Figure 6:
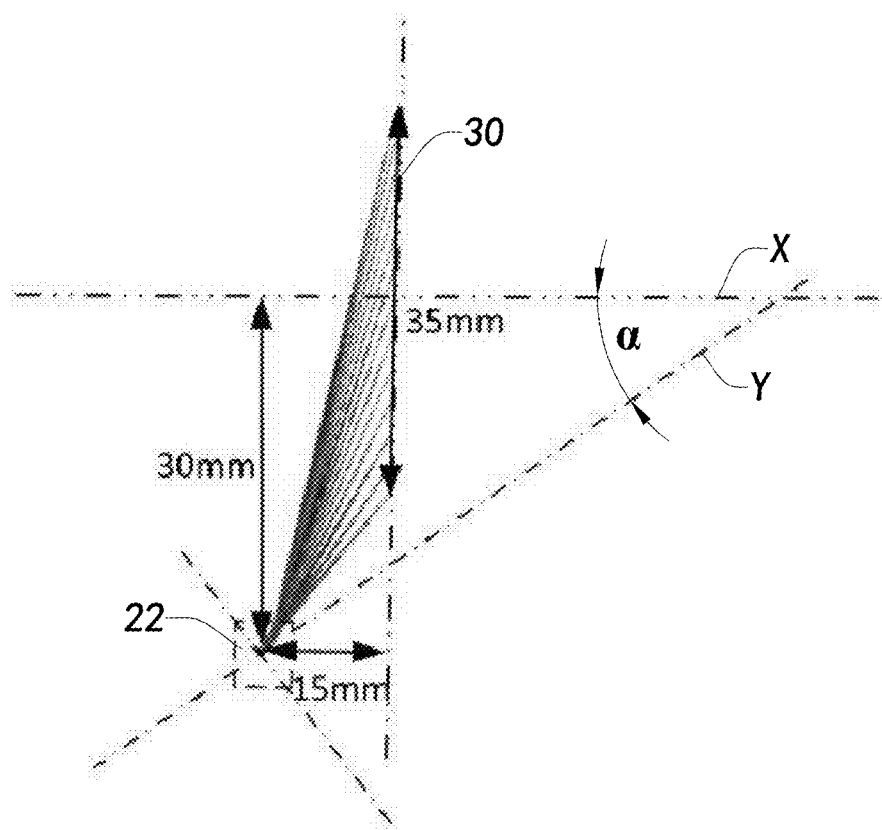
FIGS. 6 and 7 are schematic diagrams illustrating the specific design of the optical system of the eye-tracking system according to the preferred embodiment of the present invention.

In addition, as shown in the FIG. 4 of the drawings, the receiving module 22 is positioned at a side of the VR optical lens 12 (either an upper side of a lower side of the VR optical lens 12) and arranged facing towards the user's eye 30, such that the detection light 200 reflected by the user's eye 30 can be directly received by the receiving module 22. It is worth mentioning that, as shown in FIGS. 4 and 6, an axis of the user's eyeball 30 is defined as an object optical axis X and an axis of an optical lens unit 222 of the receiving module 22 is defined as an detecting optical axis Y, wherein the object optical axis X and the detecting optical axis Y are arranged to have a predetermined included angle α therebetween. In other words, the user's eyeball 30 is inclined with respect to the receiving module 22.

Figure 5:
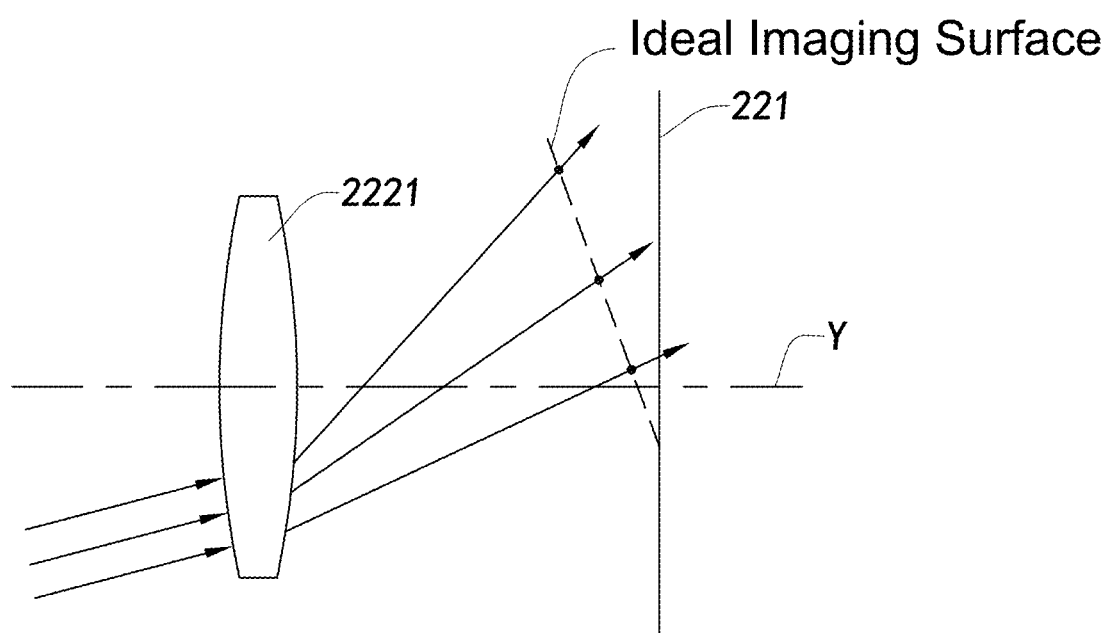
FIG. 5 is a schematic diagram illustrating a relative positional relationship between an ideal imaging plane of a receiving module and a plane defined by a photosensitive element when an imaging optical axis Y of the receiving module is perpendicular to the photosensitive element of the receiving module, according to the above preferred embodiment of the present invention.

It is appreciated that, referring to FIG. 5, when there is an included angle defined between the object optical axis X and the detecting optical axis Y, if a photosensitive element 221 of the receiving module 22 is arranged with the detecting optical axis Y in a perpendicular manner (as the conventional usual arrangement manner), the ideal imaging plane and the plane defined by the photosensitive element 221 would have an included angle therebetween, resulting that the image of the user's eyeball 30 formed at the receiving module 22 has a relatively lower sharpness and resolution.

One technical solution may be adopted to improve the imaging quality of the receiving module 22, that is to increase a field curvature of the receiving module 22, such that the ideal imaging plane can be aligned and overlapped with the plane defined by the photosensitive element 221 due to the increased field curvature. However, such increasing field curvature solution increases the optical design difficulty of the receiving module 22 while does not enhance the image quality much.

According to the preferred embodiment of the present invention, another solution is applied that adjusting a relative positional relationship between the plane defined by the photosensitive element 221 and the detecting optical axis Y. That is to change the relative positional relationship between the photosensitive element 221 and the optical lens unit 222, so as to enable the ideal imaging plane to be overlapped with the plane defined by the photosensitive element 221 as much as possible. In other words, in this technical solution of the present invention, the relative positional relationship between the photosensitive element 221 and the optical lens unit 222 is adjusted so as to enable the plane defined by the photosensitive element 221 is not parallel with the plane defined by the optical lens unit 222. That is, a predetermined including angle β is defined between the plane defined by the photosensitive element 221 and the plane defined by the optical lens unit 222. For the purpose of easier understanding and description, this technical solution is defined as "Inclined Imaging" solution, since the photosensitive element 221 is inclined with the optical lens unit 222 in the present invention.

It is worth mentioning that, compared with the above first technical solution, the difficulty of the design of the receiving module 22 is greatly reduced according to the present "inclined imaging" solution. Also, the imaging point positions will be more dense along with the increase of the field of view angle of the receiving module 22 that substantially compensates the relative contrast of the receiving module 22 in certain extent.

In optical design and implementation, the including angle β between the plane defined by the photosensitive element 221 and the plane defined by the receiving module 22 is determined based on the included angle α between the object optical axis X and the imaging optical axis Y as well as the parameters of the optical lens unit 222. In other words, in order to figure out the including angle β, the included angle α and the parameters of the optical lens unit optical lens unit 222 must be pre-determined.

It is appreciated that when adopting the "inclined imaging" solution, the optical design for the optical lens unit 222 of the receiving module 22 can be simplified. In particular, according to the preferred embodiment of the present invention, the optical lens unit 222 of the receiving module 22 may be embodied as a single piece of aspheric optical lens 2221 having predetermined optical parameters such as focal power and etc. Accordingly, the plane defined by the optical lens unit 222 refers to the plane defined by the aspheric optical lens 2221 in this embodiment.

In addition, according to the preferred embodiment of the present invention, the included angle α between the object optical axis X and the detecting optical axis Y is determined based on a distance between the user's eyeball 30 and the VR optical lens 12, a predetermined diameter of the user's eye 30 and a distance between the VR optical lens 12 and the receiving module 22. Typically, the included angle α between the object optical axis X and the detecting optical axis Y is set ranging from 25.0° to 40.0°.

Figure 7:
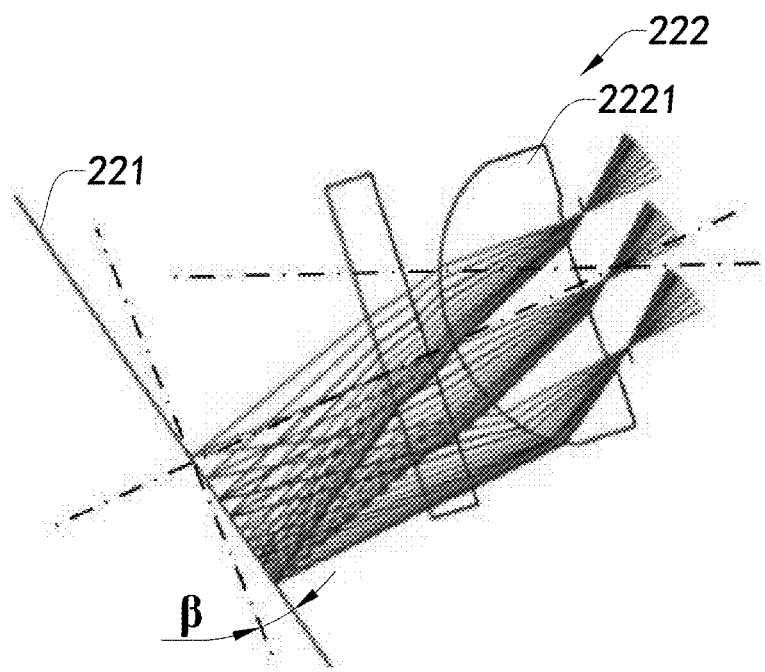
Figure 8:
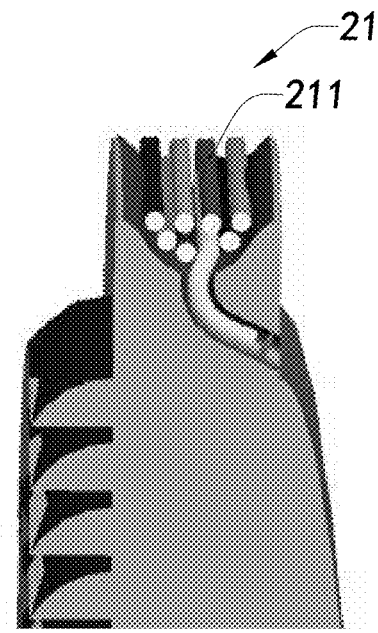
FIGS. 8 and 9 are schematic view of the at least one light source of the eye-tracking system according to the preferred embodiment of the present invention.
Figure 9:
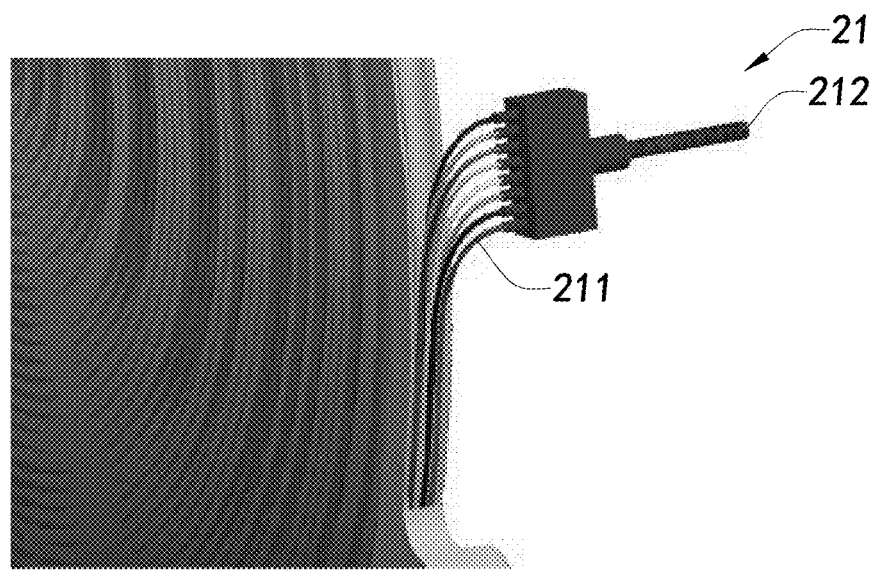
Figure 10:
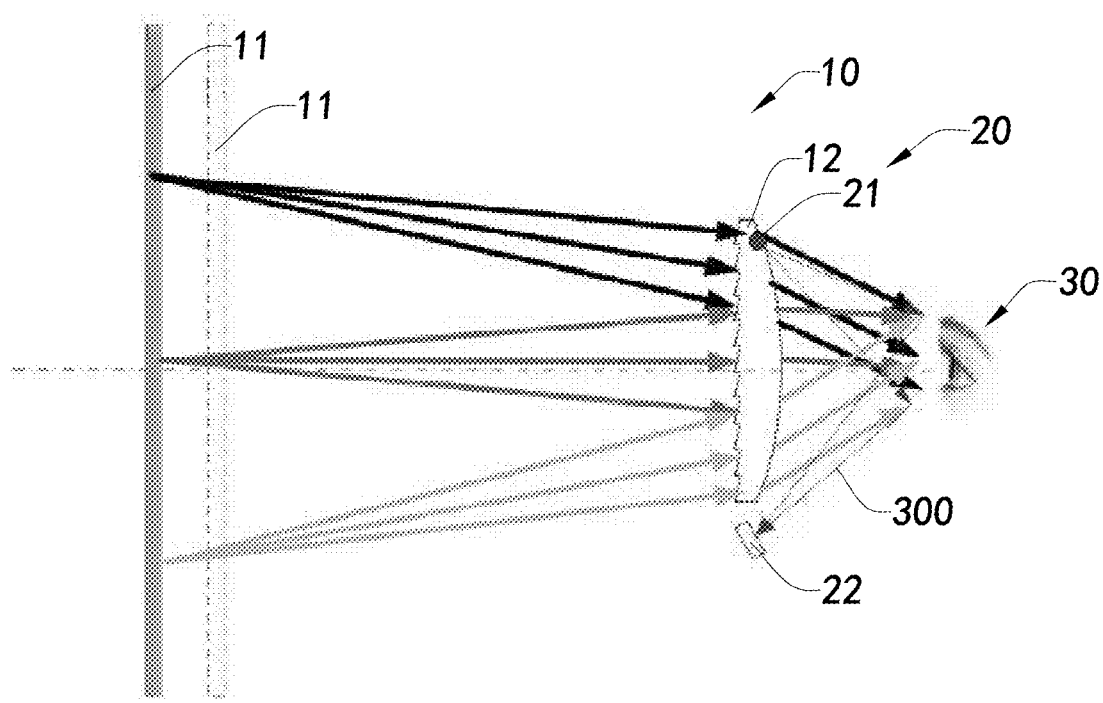
FIG. 10 is schematic diagram illustrating the process of adjusting a diopter of the head-mounted viewable device according to the preferred embodiment of the present invention.

Referring to FIG. 6 and FIG. 7 of the drawings of the preferred embodiment of the present invention, a specific optical system of the eye-tracking system 20 according to the preferred embodiment of the present invention is illustrated, wherein the distance between the user's eye 30 and the VR optical lens 12 is set as 15 mm, the predetermined diameter of the user's eye 30 is set as 35 mm, and the distance between the VR optical lens 12 and the receiving module 22 is set as 30 mm, as shown in FIG. 6. Based on the above three parameters and the optical parameters of the receiving module 22, the included angle α defined between the object optical axis X and the imaging optical axis Y is determined as 32°.

Accordingly, while the included angle α between object optical axis X and the detecting optical axis Y is set as 32° and the optical lens unit 222 of the receiving module 22 is embodied as the single piece of aspheric optical lens, it is known through testing and optimization that the imaging performance of the receiving module 22 is able to better meet the design requirement when the including angle β between the plane defined by the photosensitive element 221 and the plane defined by the receiving module receiving module 22 is set as 20°, as shown in FIG. 7.

Person skilled in this art would understand that, according to the preferred embodiment of the present invention, the including angle β between the plane defined by the photosensitive element 221 and the plane defined by the receiving module receiving module 22 is a variable that is determined by the included angle α between the object optical axis X and the imaging optical axis Y, and the parameters of the optical lens unit 222. In addition, in the preferred embodiment, the imaging quality and performance of the receiving module 22 can be optimized by adjusting the including angle β between the plane defined by the photosensitive element 221 and the plane defined by the receiving module receiving module 22, so as to determine the final value of the including angle between the plane defined by the photosensitive element 221 and the plane defined by the receiving module receiving module 22 for acquiring a satisfied imaging quality and effect.

In order for further optimizing the performance of the eye-tracking system 20, the type of the light source and its arrangement are adjustable according to the preferred embodiment of the present invention. Accordingly, the eye-tracking system 20 comprises eight light sources 21 peripherally provided along a peripheral edge of the VR optical lens 12 for projecting one or more detection lights 200 to the user's eyeball 30. Specifically, as shown in the FIGS. 8 and 9 of the drawings, each of the light sources 21 comprises multiple optical fibers 211 and a non-visible light source 212 (such as near infrared or infrared light source) communicating with the optical fibers 211, such that when the non-visible light source 212 is activated and powered on, each optical fiber 211 of the multiple optical fibers 211 generates the detection light 200 for multiple points illumination.

It is worth mentioning that, in comparison with the conventional LED (Light Emitting Diode) light source, the light source beam formed by the multiple optical fibers 211 has a relative smaller size that effectively reduces the limitation of light source to the field of view of human beings and thus reduces blind spots. In addition, the replacement the conventional LED light source with the multiple optical fibers 211 effectively reduces the production cost and makes the product a more light and nice ornamental appearance.

As described above, as a head wear viewable apparatus, the head-mounted viewable device should be regulated and adjusted to accommodate and fit the degree of the short sight or long sight of the human user so as to meet the requirement and satisfy the customer experience. In particular, according to the preferred embodiment of the present invention, as shown in the FIG. 10 of the drawings, the display 11 is movable relative to the VR optical lens 12 so that a distance between the display 11 and the VR optical lens 12 can be adjusted in order to adjust a diopter of the user's eyeball 30. It should be understand that, in comparison with the conventional technology that maintains the relative positions of the stationary reflecting lens and the receiving module, according to the moving of the VR optical lens 12 to adjust the diopter of the human eye of the present invention, the relative positional relationships of the VR optical lens 12, the receiving module 22 and the user's eye 30 are fixed according to the movable display 11 of the technology applied in the present invention. In other words, the optical path of the eye-tracking system 20 is fixed that enhances the stability of entire head-mounted viewable device.

Correspondingly, according to another aspect of the present invention, the present invention further provides a diopter adjusting method for the head-mounted viewable device, which comprises the steps of: moving the display 11 to adjust a distance between the display 11 and the VR optical lens 12, so as to adjust a diopter of the user's eyeball 30. In particular, the eye-tracking system 20 is integrally configured with the VR optical lens 12 that the VR optical lens 12 and the eye-tracking system 20 have an integral structure according to the preferred embodiment of the present invention.

Further, since the eye-tracking system 20 is integrally configured with the VR optical lens 12, by means of the stable structural relationship of the eye-tracking system 20 and the VR optical lens 12, the stability of the optical performance of the VR optical lens 12 and the eye-tracking system 20 is ensured. Meanwhile, such integrated configuration also benefits for eliminating the errors in assembling process, reducing weight thereof and post-maintenance of the head-mounted viewable device.

In general, by designing the optical path of the eye-tracking system 20, it enables the detection light 200 for detecting the sight detection of the user's eyeball 30 being directly received by the receiving module without passing through and being optically processed by the VR optical lens 12. Therefore, the optical path of the eye-tracking system 20 is independent from the virtual imaging optical path in the present invention.

Illustrative Eye-Tracking System

Referring to FIGS. 4 to 10 of the drawing, according to another aspect of the present invention, the present invention further provides an eye-tracking system 20, wherein the eye-tracking system 20 is configured for detecting a sight direction of the user's eyeball 30. As shown in the FIG. 4 of the drawing, the eye-tracking system 20 comprises at least one light source 21 and a receiving module 22, wherein the at least one light source 21 is configured to produce a detection light 200 to the user's eyeball 30, while the receiving module 22 is arranged to receive the reflected detection light 200 from the user's eyeball 30, so as to detect a sight direction of the user's eye 30. Upon acquiring the sight direction of the user's eyeball 30 via the eye-tracking system 20, a display position of the virtual scene image at the display 11 is adjusted responsive to the detected sight direction so as to ensure the virtual scene image remaining within the field of view of human eye, i.e. to be observed by the user's eyeball 30.

Referring to the FIG. 4 of the drawings, according to the preferred embodiment of the present invention, the optical path design for the eye-tracking system 20 is adjustable to make the detection light 200 for detecting the sight direction of the user's eyeball 30 being directly received by the receiving module 22 without passing through the VR optical lens 12. Accordingly, the optical systems of the virtual imaging system 10 and the eye-tracking system 20 are independent with each other in the present invention, such that the difficulty of the design of the eye-tracking system 20 can be reduced while its structure is simplified, and that the overall performance of the head-mounted viewable device is more stable.

In particular, according to the preferred embodiment of the present invention, the receiving module 22 of the eye-tracking system 20 is arranged facing towards the user's eyeball 30 such that the detection light 200 reflected by the user's eye 30 is directly received by the receiving module 22 without passing through the VR optical lens and being reflected by the reflector as in the conventional eye-tracking system of the conventional head-mounted viewable device. Accordingly, in view of the VR optical lens 12 in the present invention, the VR optical lens 12 merely needs to optically process the visible light of the virtual scene image projected by the display 11 without having to optically process the non-visible light of the detection light in the eye-tracking optical system. In other words, according to the preferred embodiment of the present invention, the difficulty of the optical design of the VR optical lens 12 is reduce while simplifying the structure thereof.

Furthermore, owing to the specific arrangement of the receiving module 22 (facing towards the user's eye 30), the optical path of the eye-tracking system 20 has been simplified to the order of the at least one light source 21—the user's eye 30—the receiving module 22, instead of the conventional order of the light source—the user's eye—the VR optical lens—the reflector—the receiving module in the conventional head-mounted viewable device. As it can be seen from the simplification of the optical path of the eye-tracking system 20, the number of the optical components involved in the eye-tracking system 20 of the present invention is reduced. Those who skilled in the art would understand that a single system that includes fewer elements is more easily to be assembled with a high accuracy among the elements while the whole system is more stable correspondingly. In other words, the design difficulty, the assembly difficulty, and the complexity of the structure of the eye tracking system 20 are thus reduced according to the preferred embodiment of the present invention.

It is appreciated that the virtual imaging system 10 and the eye-tracking system 20 are structurally independent with each other due to the adjustability of the eye-tracking system 20. In other words, from a structural perspective, the virtual imaging system 10 and the eye-tracking system 20 are two completely independent systems. Those who skilled in the art would understand that, as for multiple systems, the lower the degree of the association among the systems is, the more stable the systems will be. According to the preferred embodiment of the present invention, there is no common optical component equipped between the virtual imaging system 10 and the eye-tracking system 20 (the VR optical lens 12). That is, the degree of association between the virtual imaging system 10 and the eye-tracking system 20 is relatively lower, and thus the head-mounted viewable device which comprises the virtual imaging system 10 and the virtual imaging system 10 has a high performance in stability.

Further, as shown in the FIG. 4 of the drawings, according to the preferred embodiment of the present invention, the receiving module 22 is positioned at a side of the VR optical lens 12 (either upper side of lower side of the VR optical lens 12) and arranged facing towards the user's eye 30 in such a manner that the detection light 200 reflected by the user's eye 30 is directly received by the receiving module 22. It is worth mentioning that the axis of the user's eyeball 30 is set as the object optical axis X and the axis of the optical lens unit 222 of the receiving module 22 is set as the detecting optical axis Y, wherein the included angle α is defined between the object optical axis X and the detecting optical axis Y. In other words, the user's eye 30 is inclined with the receiving module 22.

Person skilled in the art should appreciate that, referring to FIG. 5, when the object optical axis X and the detecting optical axis Y have the included angle α therebetween, if the detecting optical axis Y is perpendicular to the photosensitive element 221 of the receiving module 22, there is an including angle defined between the ideal imaging plane and the plane defined by the photosensitive element 221 that, in view of the imaging performance, the image of the user's eye 30 formed at the receiving module 22 is a relatively lower sharpness and resolution.

As mentioned above, one technical solution could be adopted to improve the imaging quality of the receiving module 22, that is to increase a field curvature of the receiving module 22, such that the ideal imaging plane can be aligned and overlapped with the plane defined by the photosensitive element 221 due to the increased field curvature. However, such increasing field curvature solution increases the optical design difficulty of the receiving module 22 while does not enhance the image quality much.

Preferably, according to the preferred embodiment of the present invention, another solution is applied by adjusting a relative positional relationship between the plane defined by the photosensitive element 221 and the detecting optical axis Y. That is by changing the relative positional relationship between the photosensitive element 221 and the optical lens unit 222, the ideal imaging plane is arranged to be overlapped with the plane defined by the photosensitive element 221 as much as possible. In other words, in this technical solution of the present invention, the relative positional relationship between the photosensitive element 221 and the optical lens unit 222 is adjusted to ensure the plane defined by the photosensitive element 221 being not parallel with the plane defined by the optical lens unit 222, and that the including angle β is defined between the plane defined by the photosensitive element 221 and the plane defined by the optical lens unit 222. For the purpose of easier understanding and description, as mentioned above, such technical solution is defined as "Inclined Imaging" solution, since the photosensitive element 221 is inclined with the optical lens unit 222.

It is worth mentioning that, compared with the above first technical solution, the difficulty of the design of the receiving module 22 is greatly reduced according to the present "inclined imaging" solution. Also, the imaging point positions will be more dense due to the increase of the field of view angle of the receiving module 22, that substantially compensates the relative contrast of the receiving module 22 in certain extent.

In optical design and implementation, the including angle β between the plane defined by the photosensitive element 221 and the plane defined by the receiving module 22 is determined based on the included angle α between the object optical axis X and the imaging optical axis Y as well as the parameters of the optical lens unit 222. In other words, in order to figure out the including angle β, the included angle α and the parameters of the optical lens unit optical lens unit 222 must be pre-determined.

It is appreciated that when adopting the "inclinedly imaging" solution, the optical design for the optical lens unit 222 of the receiving module 22 can be simplified. In particular, the optical lens unit 222 of the receiving module 22 may be embodied as one piece of aspheric optical lens 2221 having predetermined optical parameters (such as refractive power and etc). Accordingly, the plane defined by the optical lens unit 222 refers to the plane defined by the aspheric optical lens 2221 in this embodiment.

In addition, according to the preferred embodiment of the present invention, the included angle α between the object optical axis X and the detecting optical axis Y is determined based on a distance between the user's eyeball 30 and the VR optical lens 12, a predetermined diameter of the user's eye 30 and a distance between the VR optical lens 12 and the receiving module 22. Typically, the included angle α between the object optical axis X and the detecting optical axis Y is set ranging from 25.0° to 40.0°. Referring to FIG. 6 and FIG. 7 of the drawings of the preferred embodiment of the present invention, a specific optical system of the eye-tracking system 20 according to the preferred embodiment of the present invention is illustrated, wherein the distance between the user's eye 30 and the VR optical lens 12 is set as 15 mm, the predetermined diameter of the user's eye 30 is set as 35 mm, and the distance between the VR optical lens 12 and the receiving module 22 is set as 30 mm, as shown in FIG. 6. Based on the above three parameters and the optical parameters of the receiving module 22, the included angle α defined between the object optical axis X and the imaging optical axis Y is determined as 32°.

Accordingly, while the included angle α between object optical axis X and the detecting optical axis Y is set as 32° and the optical lens unit 222 of the receiving module 22 is embodied as the single piece of aspheric optical lens, it is known through testing and optimization that the imaging performance of the receiving module 22 is able to better meet the design requirement when the including angle β between the plane defined by the photosensitive element 221 and the plane defined by the receiving module receiving module 22 is set as 20°, as shown in FIG. 7.

Person skilled in this art would understand that, according to the preferred embodiment of the present invention, the including angle β defined between the plane defined by the photosensitive element 221 and the plane defined by the receiving module receiving module 22 is variable that is determined by the included angle α between the object optical axis X and the imaging optical axis Y, and the parameters of the optical lens unit 222. Also, in the preferred embodiment, the imaging quality and performance of the receiving module 22 are able to be optimized by adjusting the including angle between the plane defined by the photosensitive element 221 and the plane defined by the receiving module receiving module 22, so as to determine the final value of the including angle β between the plane defined by the photosensitive element 221 and the plane defined by the receiving module receiving module 22 for acquiring a satisfied imaging quality and effect.

In order to further optimize the performance of the eye-tracking system 20, the type of the light source and arrangement thereof are adjustable according to the preferred embodiment of the present invention. Accordingly, the eye-tracking system 20 comprises eight light sources 21 which are peripherally provided along a peripheral edge of the VR optical lens 12 for projecting detection lights 200 to the user's eyeball 30. In particular, as shown in the FIGS. 8 and 9 of the drawings, each of the light sources 21 comprises multiple optical fibers 211 and a non-visible light source 212 (such as near infrared or infrared light source) communicating with the optical fibers 211, such that when the non-visible light source 212 is activated and powered on, each optical fiber 211 of the multiple optical fibers 211 generates the detection light 200 for multiple points illumination.

It is worth mentioning that, in comparison with the conventional LED (Light Emitting Diode) light source, the light source beam formed by the multiple optical fibers 211 has a relative smaller size that effectively reduces the limitation of light source to the field of view of human beings and thus reduces blind spots. In addition, the replacement the conventional LED light source with the multiple optical fibers 211 effectively reduces the production cost and makes the product a more light and nice ornamental appearance.

According to another aspect of the present invention, the present invention provides an eye-tracking method of the head-mounted viewable device, comprising the steps of:

projecting the detection light 200 to the user's eyeball 30; and receiving the detection light 200 reflected by the user's eye 30 through the receiving module 22 to detect the sight direction of the user's eyeball 30, wherein the receiving module 22 is positioned at the side of the VR optical lens 12 which is arranged for facing towards the user's eye 30, such that the detection light 200 reflected by the user's eye 30 is directly received by the receiving module 22.

In view of above, the eye-tracking system 20 equipped in the head-mounted viewable device is exampled for illustration purpose. However, those who skilled in the art would understand that, according to the preferred embodiment of the present invention, the eye-tracking system 20 may further be applied in other VR products or even AR product, which is not indented to be limiting in the present invention.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A head-mounted viewable device, comprising:
   a display configured for displaying and projecting a virtual scene image to at least one eyeball of the user who is wearing said head-mounted viewable device;
   a VR (Virtual Reality) optical lens configured to form an optical path between said display and the one or more eyeballs of the user for allowing said virtual scene image being displayed at and projected from said display to reach the eyeball of the user through said VR optical lens; and
   an eye-tracking system configured to detect a sight direction of the eyeball of the user and adjust a display position of said virtual scene image at said display according to said detected sight direction, wherein said eye-tracking system comprises:
   at least one light source configured to project a detection light to the one or more eyeballs of the user; and
   a receiving module configured to receive said detection light reflected by the eyeball of the user so as to detect said sight direction of the eyeball of the user, wherein said receiving module is positioned at a side of said VR optical lens for facing towards the eyeball of the user, such that said detection light reflected by the eyeball of the user is directly received by said receiving module, wherein said receiving module comprises an optical lens unit and a photosensitive element, wherein said optical lens unit comprises at least one optical lens configured for receiving said detection light reflected by the eyeball of the user, wherein a plane defined by said photosensitive element and a plane defined by said at least one optical lens have an including angle defined therebetween, wherein said including angle between said plane defined by said photosensitive element and said plane defined by said at least one optical lens is determined based on an included angle defined between an object optical axis defined by the eyeball of the user and a detecting optical axis defined by said receiving module, as well as optical parameters of said at least one optical lens, wherein said included angle between the object optical axis defined by the eyeball of the user and the detecting optical axis defined by said receiving module is determined based on a distance between the eyeball of the user and said VR optical lens, a predetermined diameter of the respective eyeball of the user, and a distance between said VR optical lens and said receiving module, wherein said included angle between the object optical axis defined by the eyeball of the user and the imaging optical axis defined by said receiving module is ranged 25.0° to 40.0°.

2. The head-mounted viewable device, as recited in claim 1, wherein said included angle between the object optical axis defined by the eyeball of the user and the detecting optical axis defined by said receiving module is 32°.

3. The head-mounted viewable device, as recited in claim 2, wherein said including angel between said plane defined by said photosensitive element and said plane defined by said at least one optical lens is 20°.

4. The head-mounted viewable device, as recited in claim 1, wherein said at least one optical lens is a single piece aspheric optical lens.

5. The head-mounted viewable device, as recited in claim 4, wherein said eye-tracking system is integrally configured with said optical VR lens that said VR optical lens and said eye-tracking system have an integral structure.

6. The head-mounted viewable device, as recited in claim 4, wherein said at least one light source comprises eight light sources peripherally provided along said peripheral edge of said VR optical lens for projecting said detection light to the eyeball of the user.

7. The head-mounted viewable device, as recited in claim 6, wherein each of said light sources comprises multiple optical fibers and a non-visible light source communicating with said optical fibers in such a manner that when said non-visible light source is activated, each of said optical fibers projects said detection light.

8. The head-mounted viewable device, as recited in claim 3, wherein said display is movable relative to said VR optical lens so as to adjust a diopter of the eyeball of the user by adjusting a distance between said display and said VR optical lens.

9. An eye-tracking system for a head-mounted viewable device for a user to wear, comprising:

at least one light source configured for projecting a detection light to at least an eyeball of the user who is wearing the head-mounted viewable device; and a receiving module configured to receive said detection light reflected by the eyeball of the user so as to determine said sight direction of the eyeball of the user, wherein said receiving module is positioned at a side of a VR optical lens of the head-mounted viewable device for facing towards the eyeball of the user such that said detection light reflected by the eyeball of the user is directly received by said receiving module, wherein said receiving module comprises an optical lens unit and a photosensitive element, wherein said optical lens unit comprises at least one optical lens for receiving said detection light reflected by the eyeball of the user, and a plane defined by said photosensitive element and a plane defined by said at least one optical lens have an including angle defined therebetween, wherein said including angle between said plane defined by photosensitive element and said plane defined by said at least one optical lens is determined based on an included angle defined between an object optical axis defined by the eyeball of the user and a detecting optical axis defined by said receiving module, as well as optical parameters of said at least one optical lens, wherein said included angle between the object optical axis defined by the eyeball of the user and the detecting optical axis defined by said receiving module is determined based on a distance between the eyeball of the user and the VR optical lens, a predetermined diameter of the eyeball of the user, and a distance between the VR optical lens and said receiving module, wherein said included angle between the object optical axis defined by the eyeball of the user and the detecting optical axis defined by said receiving module is 32° and said including angle between said plane defined by said photosensitive element and said plane defined by said at least one optical lens is 20°.

* * * * *